US010075009B2

United States Patent
Lee et al.

(10) Patent No.: US 10,075,009 B2
(45) Date of Patent: *Sep. 11, 2018

(54) RECEIVING ANTENNA AND WIRELESS POWER RECEIVING DEVICE INCLUDING THE SAME

(71) Applicant: LG INNOTEK CO., LTD., Seoul (KR)

(72) Inventors: Heejung Lee, Seoul (KR); Seok Bae, Seoul (KR); Jai Hoon Yeom, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 14/901,362

(22) PCT Filed: Jun. 16, 2014

(86) PCT No.: PCT/KR2014/005253
§ 371 (c)(1),
(2) Date: Dec. 28, 2015

(87) PCT Pub. No.: WO2014/208913
PCT Pub. Date: Dec. 31, 2014

(65) Prior Publication Data
US 2016/0141909 A1     May 19, 2016

(30) Foreign Application Priority Data
Jun. 27, 2013 (KR) .................. 10-2013-0074619

(51) Int. Cl.
*H02J 7/00* (2006.01)
*H02J 7/02* (2016.01)
*H04B 5/00* (2006.01)

(52) U.S. Cl.
CPC ............ *H02J 7/025* (2013.01); *H04B 5/0037* (2013.01); *H04B 5/0081* (2013.01)

(58) Field of Classification Search
CPC ...................................................... H02J 7/025
(Continued)

(56) References Cited

U.S. PATENT DOCUMENTS 5,912,622 A * 6/1999 Endo ................. B62H 5/20
29/846
8,421,407 B2 * 4/2013 Johnson ................. H02J 7/025
108/65

(Continued)

FOREIGN PATENT DOCUMENTS

CN  1869275     11/2006
CN  101630562   1/2010
(Continued)

OTHER PUBLICATIONS

International Search Report dated Sep. 24, 2014 issued in Application No. PCT/KR2014/005253.
(Continued)

*Primary Examiner* — Yalkew Fantu
(74) *Attorney, Agent, or Firm* — KED & Associates LLP (57) ABSTRACT

A receiving antenna of a wireless power receiving device wirelessly charging electrical power according to an embodiment of the present invention includes a substrate, a soft magnetic layer stacked on the substrate, including a soft magnetic material, and having gaps at predetermined intervals, and a coil stacked on the soft magnetic layer and receiving electromagnetic energy emitted from a wireless power transmission device.

12 Claims, 6 Drawing Sheets

(58) Field of Classification Search
USPC .......................................................... 320/108
See application file for complete search history.

(56) References Cited

U.S. PATENT DOCUMENTS

| | | |
|---|---|---|
| 2009/0121677 A1 | 5/2009 | Inoue et al. |
| 2010/0007215 A1 | 1/2010 | Sakuma |
| 2010/0207771 A1* | 8/2010 | Trigiani .............. B60L 11/1816 340/636.1 |
| 2012/0256585 A1* | 10/2012 | Partovi ................... H01F 5/003 320/108 |
| 2014/0111153 A1* | 4/2014 | Kwon ..................... H02J 7/025 320/108 |
| 2014/0300204 A1 | 10/2014 | Koyama et al. |

FOREIGN PATENT DOCUMENTS

| | | |
|---|---|---|
| JP | H 10-162261 A | 6/1998 |
| JP | 2004-348497 A | 12/2004 |
| JP | 2009-071604 A | 4/2009 |
| KR | 10-2013-0050633 A | 5/2013 |
| KR | 10-2013-0060995 A | 6/2013 |

OTHER PUBLICATIONS

European Search Report dated Apr. 1, 2016 issued in Application No. 14817657.1.
European Patent Office Communication dated Mar. 15, 2018 issued in Application No. 14817657.1.
Chinese Office Action dated Apr. 3, 2018 issued in Application No. 201480037232.2 (with English translation).

* cited by examiner

RECEIVING ANTENNA AND WIRELESS POWER RECEIVING DEVICE INCLUDING THE SAME

CROSS-REFERENCE TO RELATED PATENT APPLICATIONS

This application is a U.S. National Stage Application under 35 U.S.C. § 371 of PCT Application No. PCT/KR2014/005253, filed Jun. 16, 2014, which claims priority to Korean Patent Application No. 10-2013-0074619, filed Jun. 27, 2013, whose entire disclosures are hereby incorporated by reference.

TECHNICAL FIELD

The present invention relates to wireless charging, and more particularly, to a receiving antenna for wireless charging and a wireless power receiving device including the same.

BACKGROUND ART

The wireless power transceiving technology is a technology which provides electric power to electronic devices wirelessly, and may be diversely applied to a power supply for household electronic products and for electric cars or subway trains, as well as battery charging of portable terminals.

It is necessary to minimize an energy loss between a wireless power transmission device and a wireless power receiving device to increase power transceiving efficiency. For this, a transmitting antenna and a receiving antenna may be mutually arranged within an effective distance. Further, a soft magnetic material may be disposed around the transmitting antenna and the receiving antenna to focus electromagnetic energy emitted from the transmitting antenna toward the receiving antenna.

Meanwhile, the wireless power receiving device may include a module which simultaneously has a wireless power conversion (WPC) function and a near field communication (NFC) function. The WPC function operates at low frequency, and the NFC function operates at high frequency. Therefore, a soft magnetic material for the receiving antenna needs to have a low loss characteristic at high frequency as well as at low frequency.

DISCLOSURE

Technical Problem

The present invention aims to provide a receiving antenna minimizing a magnetic loss, and a wireless power receiving device including the receiving antenna.

Technical Solution

According to an embodiment of the present invention, a receiving antenna of a wireless power receiving device wirelessly charging electrical power includes a substrate, a soft magnetic layer stacked on the substrate, including a soft magnetic material, and having gaps at predetermined intervals, and a coil stacked on the soft magnetic layer, and receiving an electromagnetic energy emitted from a wireless power transmission device.

The receiving antenna may further include a support fixture which supports the soft magnetic layer, between the substrate and the soft magnetic layer.

The coil may be wound in a direction parallel to the soft magnetic layer on the soft magnetic layer, and at least a part of the coil disposed between two gaps may be disposed in parallel with the gaps.

The soft magnetic layer may include a plurality of sub soft magnetic layers separated by the gaps.

The width of each of the sub soft magnetic layers may be one to fifty times the thickness of the soft magnetic layer.

Each of the sub soft magnetic layers may be formed with a width of 0.02 mm to 5 mm.

Each of the sub soft magnetic layers may be formed with a width of 0.02 mm to 1 mm.

The soft magnetic layer may be a metallic ribbon.

The metallic ribbon may be a nanocrystalline metallic ribbon.

The gaps may be filled with an acrylate-based resin.

According to another embodiment of the present invention, a wireless power receiving device wirelessly charging electrical power includes a substrate, a soft magnetic layer stacked on the substrate, including a soft magnetic material, and having gaps at predetermined intervals, a coil stacked on the soft magnetic layer and receiving electromagnetic energy emitted from a wireless power transmission device, a circuit unit connected to the coil and converting the electromagnetic energy into electrical energy, and a storage unit for storing the electrical energy.

Advantageous Effects

According to embodiments of the present invention, the performance of electromagnetic energy focusing of a receiving antenna in a wireless power receiving device can be increased, and therefore wireless power transceiving efficiency can be maximized.

Further, saturation magnetization is high and a magnetic loss is minimized at high frequency as well as at low frequency, and therefore a wireless power receiving device which simultaneously guarantees NFC performance and WPC performance can be obtained.

Further, an electromagnetic energy focusing effect of a required standard even with a thin thickness can be obtained, and therefore the present invention can be applied to various electronic devices of the slimness trend such as a TV, a portable terminal, a notebook, a tablet PC, etc.

Further, the wireless power receiving device according to the embodiments of the present invention has an excellent electromagnetic energy focusing performance and can use inexpensive materials, and therefore, can be applied to a large application field such as electric cars, subway trains, etc.

MODE FOR INVENTION

While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present inventive concept. The "and/or" includes each and all combinations of one or more of the items mentioned.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the inventive concept is not intended to limit the scope of the inventive concept. Elements of the inventive concept referred to in the singular may number one or more, unless the context clearly indicates otherwise. It will be further understood that the terms "comprise", "have", etc. when used herein, specify the presence of stated features, numbers, steps, operations, elements, components, and/or groups thereof, but do not preclude the presence or addition of one or more other features, numbers, steps, operations, elements, components, and/or groups thereof.

Unless otherwise defined, all terms (including technical and scientific terms) used herein are to be interpreted as is customary in the art to which this inventive concept belongs. It will be further understood that terms in common usage should also be interpreted as is customary in the relevant art and not in an idealized or overly formal sense unless expressly so defined herein.

Hereinafter, example embodiments are described with reference to the attached drawings, and same or corresponding elements regardless of drawing symbols will be given the same reference numbers, and overlapping descriptions will be omitted.

Figure 1:
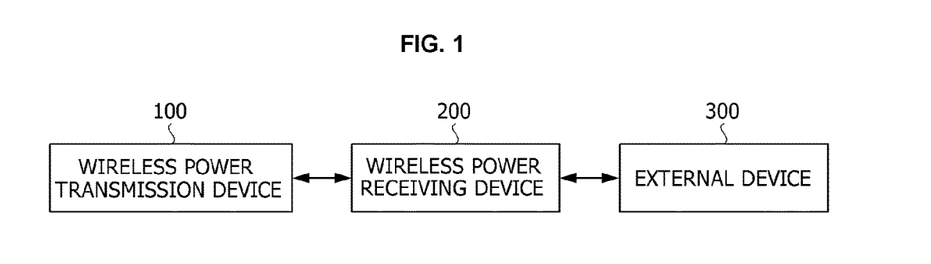
FIG. 1 is a block diagram illustrating a wireless power transceiver system in accordance with an embodiment of the present invention.

FIG. 1 is a block diagram illustrating a wireless power transceiver system in accordance with an embodiment of the present invention.

Referring to FIG. 1, the wireless power transceiver system may include a wireless power transmission device 100 and a wireless power receiving device 200. The wireless power transmission device 100 connected to a power supply applies electrical energy to a transmission antenna, and the transmission antenna converts the electrical energy into electromagnetic energy and emits the electromagnetic energy to the surroundings. The wireless power receiving device 200 receives the electromagnetic energy emitted from the transmission antenna using a receiving antenna, converts the electromagnetic energy into the electrical energy, and performs charging.

Here, the wireless power transmission device 100 may be, for example, a transmission pad. Further, the wireless power receiving device 200 may be a part of a structure of a portable terminal, household/personal electronic products, a transportation means, etc. The portable terminal, household/personal electronic products, a transportation means, etc. may be set to include only the wireless power receiving device 200, or to include both the wireless power transmission device 100 and the wireless power receiving device 200.

Here, the wireless power transmission device 100 may transmit electric power using an electromagnetic induction method or a resonance method. Similarly, the wireless power receiving device 200 may receive the electric power using the electromagnetic induction method or the resonance method.

Meanwhile, the wireless power receiving device 200 may include a module which simultaneously has a wireless power conversion (WPC) function and a near field communication (NFC) function. Here, the wireless power receiving device 200 may perform NFC with an external device 300 including an NFC module.

Figure 2:
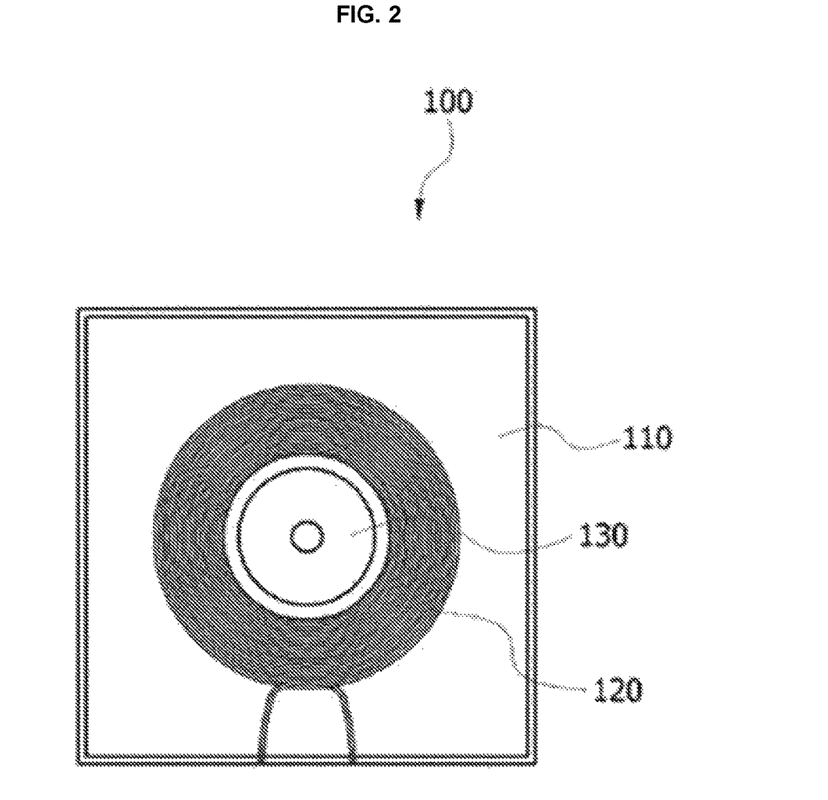
FIG. 2 is a diagram illustrating a part of a wireless power transmission device.
Figure 3:
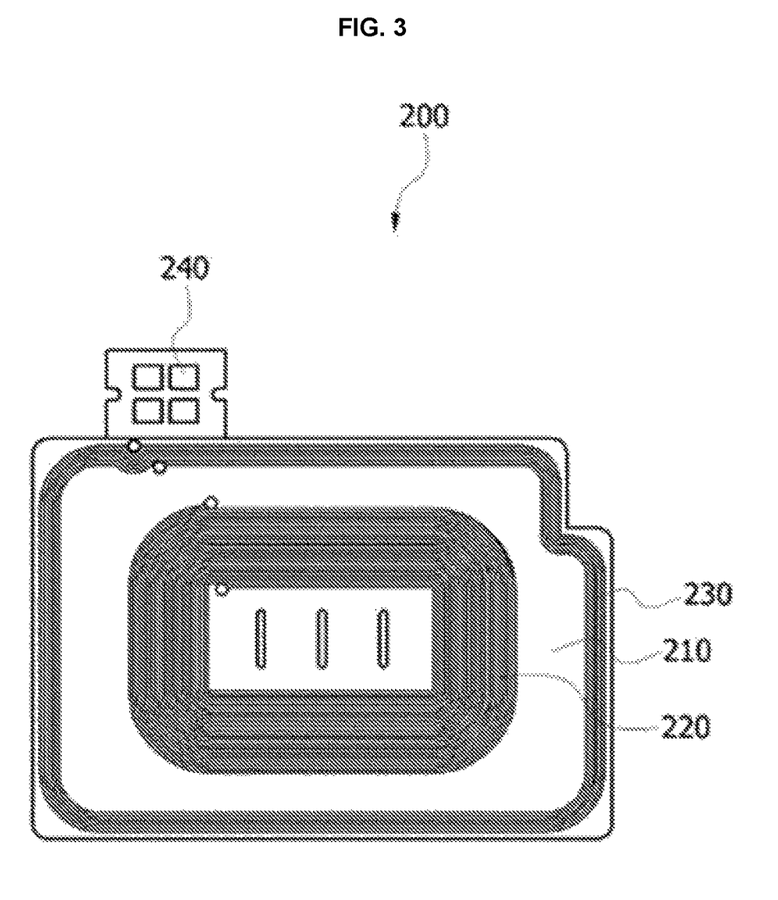
FIG. 3 is a diagram illustrating a part of a wireless power receiving device.

FIG. 2 is a diagram illustrating a part of a wireless power transmission device, and FIG. 3 is a diagram illustrating a part of a wireless power receiving device.

Referring to FIG. 2, the wireless power transmission device 100 may include a transmitting circuit (not shown), a soft magnetic core 110, a transmitting coil 120, and a permanent magnet 130.

The soft magnetic core 110 may include a soft magnetic material having a thickness of several mms. Further, the permanent magnet 130 may be surrounded by the transmitting coil 120. Here, the permanent magnet 130 is not an essential element and may be omitted according to specifications.

Referring to FIG. 3, the wireless power receiving device 200 may include a receiving circuit (not shown), a soft magnetic layer 210, and a receiving coil 220. The soft magnetic layer 210 may be stacked on a substrate (not shown). The substrate may include many layers of fixed sheets, and may be connected to the soft magnetic layer 210 to fix the soft magnetic layer 210.

The soft magnetic layer 210 focuses the electromagnetic energy emitted from the transmitting coil 120 of the wireless power transmission device 100.

The soft magnetic layer 210 may include a metallic material or a ferrite material, and may be implemented in various forms including a pellet, a plate, a ribbon, a foil, a film, etc. In one example, the soft magnetic layer 210 may be a sheet, a ribbon, a foil, or a film including nickel-zinc (Ni—Zn) ferrite or manganese-zinc (Mn—Zn) ferrite. In another example, the soft magnetic layer 210 may be a form of a single metal or alloy powdered flakes including at least one of Fe, Co, and Ni, or a composite form including a polymer resin. In still another example, the soft magnetic layer 210 may be a metallic ribbon, an alloy ribbon, a stacked ribbon, a foil, or a film including at least one of Fe, Co, and Ni.

The receiving coil 220 may be stacked on the soft magnetic layer 210. The receiving coil 220 may be wound in a direction parallel to the soft magnetic layer 210 on the soft magnetic layer 210. For example, a receiving antenna applied to a smart phone may have a form of a spiral coil which has an outer diameter of no more than 50 mm and an inner diameter of 20 mm or greater. The receiving circuit converts the electromagnetic energy received through the receiving coil 220 into the electrical energy, and charges a battery (not shown) with the converted electrical energy.

Although not shown, a heat dissipation layer may be further included between the soft magnetic layer 210 and the receiving coil 220. In this specification, the substrate, the soft magnetic layer 210, and the receiving coil 220 together may be referred to as the receiving antenna.

When the wireless power receiving device 200 simultaneously has the WPC function and the NFC function, an NFC coil 230 may be further stacked on the soft magnetic layer 210. The NFC coil 230 may be formed to surround an outer portion of the receiving coil 220.

Further, the receiving coil 220 and the NFC coil 230 may be electrically connected to each other through a terminal 240.

When the soft magnetic layer 210 is a sheet including a ferrite, magnetic permeability is good, but there may be a constraint of thickness due to a limit of high temperature plasticity and magnetic flux density. Further, when the soft magnetic layer 210 is a sheet of a composite form including metal powdered flakes and a polymer resin, there may be a problem that the magnetic permeability is decreased due to the polymer resin. On the contrary, when the soft magnetic layer 210 is a metallic ribbon, high magnetic permeability and high magnetic flux density may be obtained due to a thin thickness. However, the metallic ribbon has a problem of a large magnetic loss at high frequency. The magnetic loss may also occur in the sheet including a ferrite and the sheet of a composite form as well as in the metallic ribbon.

According to one embodiment of the present invention, gaps may be formed at predetermined intervals in the soft magnetic layer 210 to minimize an eddy current loss and a demagnetizing field.

Figure 4:
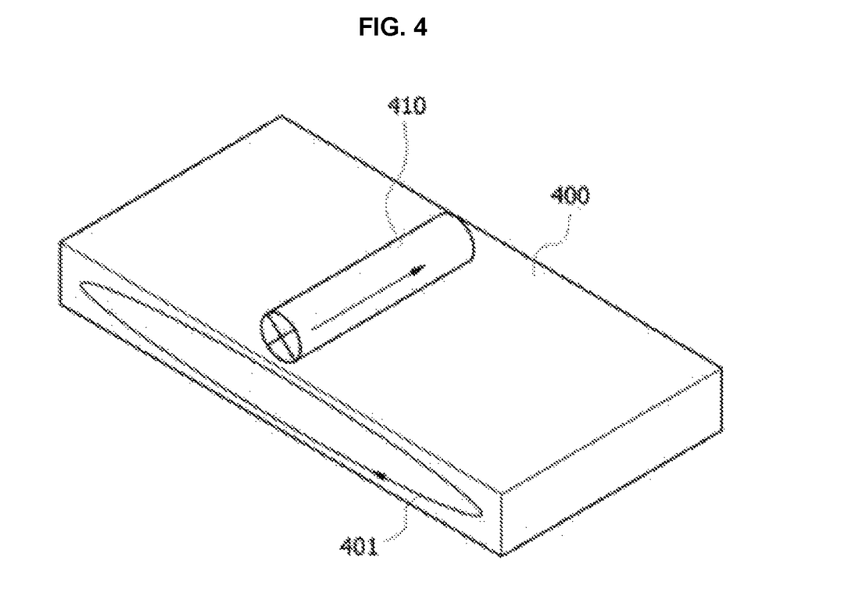
FIG. 4 is a diagram illustrating a general soft magnetic layer and a receiving coil.
Figure 5:
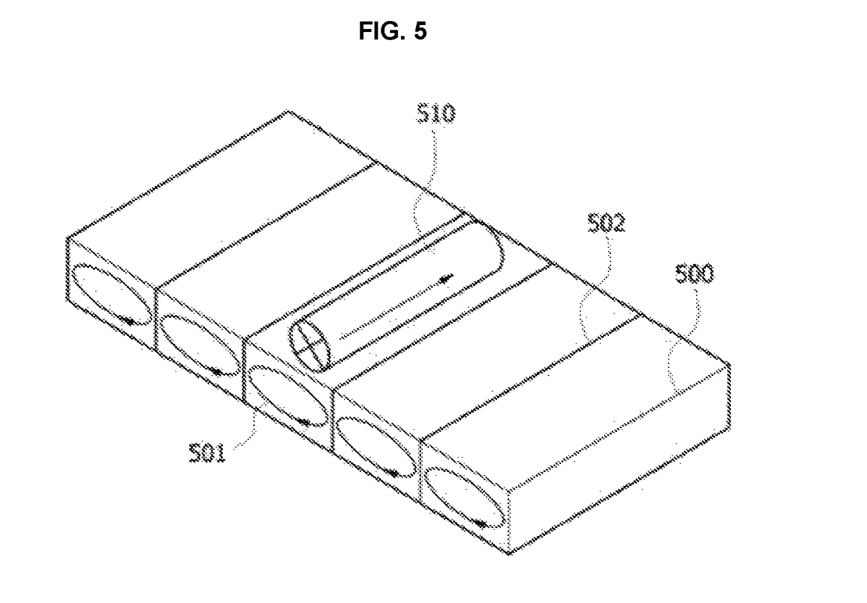
FIG. 5 is a diagram illustrating a soft magnetic layer and a receiving coil in accordance with an embodiment of the present invention.

FIG. 4 is a diagram illustrating a general soft magnetic layer and a receiving coil, and FIG. 5 is a diagram illustrating a soft magnetic layer and a receiving coil in accordance with an embodiment of the present invention.

Referring to FIG. 4, a receiving coil 410 is stacked on a soft magnetic layer 400. The soft magnetic layer 400 may be a sheet including a ferrite, a sheet of a composite form, or a metallic ribbon. When the soft magnetic layer 400 is a form of a thin film, magnetic properties in a vertical direction and a horizontal direction may be different. This is because of anisotropy due to a shape and a demagnetizing field may be generated due to the anisotropy. The demagnetizing field may be decreased as the soft magnetic layer 400 is more horizontal in a direction of a magnetic field and longer.

Meanwhile, the eddy current loss is a loss occurring in an alternating magnetic field, and is proportional to a frequency squared. The eddy current may be generated in a shape of one large loop 401 in the soft magnetic layer 400. The eddy voltage generated by a change of a magnetic field in the loop 401 is proportional to a change rate of a magnetic flux passing through a cross-section of the loop 401.

When the soft magnetic layer 400 is a metallic ribbon, a problem of the demagnetizing field and the eddy current loss becomes even greater.

Referring to FIG. 5, a receiving coil 510 is stacked on a soft magnetic layer 500 in accordance with an embodiment of the present invention. The soft magnetic layer 500 may be a sheet including a ferrite, a sheet of a composite form, or a metallic ribbon. Gaps 502 may be formed in the soft magnetic layer 500 at predetermined intervals. Accordingly, the eddy current may be generated in a shape of many small loops 501 in the soft magnetic layer 500. When a size of each of the loops 501 decreases, the eddy current may decrease and thus the eddy current loss may decrease. Although not shown, an insulating layer may be formed between the soft magnetic layer 500 and the receiving coil 510. Accordingly, the soft magnetic layer 500 may be insulated from the receiving coil 510.

Figure 6:
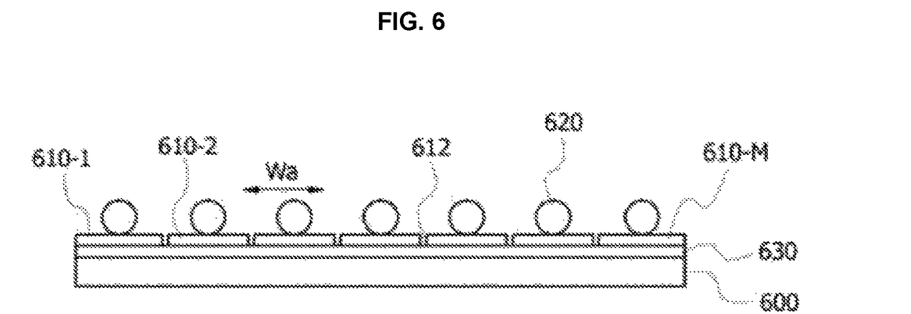
FIG. 6 is a cross-sectional view illustrating a receiving antenna included in the wireless power receiving device in accordance with an embodiment of the present invention.

FIG. 6 is a cross-sectional view illustrating a receiving antenna included in the wireless power receiving device in accordance with an embodiment of the present invention.

Referring to FIG. 6, a soft magnetic layer 610 is stacked on a substrate 600, and a coil 620 is stacked on the soft magnetic layer 610. The coil 620 may be a receiving coil or an NFC coil. Although not shown, an adhesive sheet may be used for adhesion between the soft magnetic layer 610 and the coil 620. Although not shown, an insulating layer may be formed between the soft magnetic layer 610 and the coil 620.

According to an example embodiment, gaps 612 may be formed at predetermined intervals in the soft magnetic layer 610. The gaps 612 refer to spaced intervals in a horizontal direction of the soft magnetic layer 610, and may be a term used interchangeably with slits, etc. Here, at least a part of the coil 620 may be disposed in parallel with the gaps 612 between two gaps. Due to the gaps 612 formed in the soft magnetic layer 610, a size of each loop for the eddy current becomes smaller, and the eddy current may decrease. That is, the soft magnetic layer 610 may include a plurality of sub soft magnetic layers 610-1 to 610-M separated by the gaps 612. The plurality of sub soft magnetic layers 610-1 to 610-M may be completely separated by the gaps 612, and disposed on the same plane.

Here, the width of each of the sub soft magnetic layers 610-1 to 610-M may be one to fifty times the thickness of the soft magnetic layer 610. For example, when the thickness of the soft magnetic layer 610 is 0.02 mm, the width Wa of each sub soft magnetic layer may be 0.02 mm to 1 mm. It is not possible to implement the soft magnetic layer with a width smaller than 0.02 mm due to a constraint of a process, and when the width of the sub soft magnetic layer is over 1 mm, a high frequency loss rate may increase and the effect of reducing the eddy current loss may be decreased. When the thickness of the soft magnetic layer 610 is 0.01 mm, the width Wa of each sub soft magnetic layer may be 0.1 mm to 5 mm. In this specification, the width of a sub soft magnetic layer may be used interchangeably with a gap interval.

Meanwhile, the width of each gap Wb may be 0.1 mm to 1.0 mm. As described above, when the sub soft magnetic layers 610-1 to 610-M are completely separated by the gaps, it is possible to prevent the eddy current from being transferred to an adjacent sub soft magnetic layer, and the eddy current may be reduced.

The simulation result for the loss rate ($\mu''/\mu' \times 100$) based on a material of the soft magnetic layer and a frequency is in the Table 1 below. Here, it will be assumed that the width of the soft magnetic layer is 0.02 mm.

TABLE 1

| material | width of sub soft magnetic layer | 1 MHz | | | 13.56 MHz | | |
|---|---|---|---|---|---|---|---|
| | | magnetic permeability ($\mu'$) | loss ($\mu''$) | loss rate (($\mu''/\mu'$) × 100) | magnetic permeability ($\mu'$) | loss ($\mu''$) | loss rate (($\mu''/\mu'$) × 100) |
| Amorphous-metallic ribbon (1 layer) | no gap | 475.78 | 240.69 | 50.58% | 127.61 | 123.69 | 96.92% |
| | 5 mm | 375.14 | 105.4 | 28.09% | 125.86 | 107.98 | 85.79% |
| | 1 mm | 192.61 | 26.77 | 13.89% | 103.83 | 59.05 | 56.87% |
| | 0.7 mm | 170.36 | 20.71 | 12.16% | 98.74 | 50.62 | 51.26% |
| | 0.5 mm | 155.12 | 15.62 | 10.06% | 93.09 | 45.29 | 48.65% |
| | 0.3 mm | 120.08 | 11.34 | 9.44% | 87.96 | 41.98 | 47.73% |
| | 0.02 mm | 50.91 | 1.99 | 3.91% | 46.54 | 9.00 | 19.34% |
| Nanocrystalline metallic ribbon (1 layer) | no gap | 372.36 | 107.67 | 28.91% | 122.12 | 111.28 | 91.12% |
| | 5 mm | 322.09 | 74.30 | 23.06% | 123.14 | 98.98 | 80.38% |
| | 1 mm | 174.27 | 19.39 | 11.12% | 109.27 | 49.27 | 45.09% |
| | 0.7 mm | 140.12 | 10.99 | 7.84% | 100.71 | 39.25 | 38.97% |
| | 0.5 mm | 118.87 | 4.88 | 4.10% | 88.46 | 28.24 | 31.92% |
| | 0.3 mm | 99.78 | 2.04 | 2.04% | 79.88 | 16.81 | 21.04% |
| | 0.02 mm | 42.19 | 0.69 | 1.64% | 40.51 | 3.78 | 9.33% |

A support fixture 630 may be further included between the substrate 600 and the soft magnetic layer 610 to support the soft magnetic layer 610 in which the gaps 612 are formed. The support fixture 630 may include an adhesive material. Although not limited, the gaps 612 may be formed by performing a slitting process after stacking the soft magnetic layer 610 on the support fixture 630.

Here, the gaps 612 may be filled with an acrylate-based resin. The acrylate-based resin may increase adhesion between the support fixture 630 and the soft magnetic layer 610, and may perform insulation between the sub soft magnetic layers.

Although not shown, the gaps 612 may be formed in a shape of a broken line. In this case, the soft magnetic layer 610 may be fixed between the substrate 600 and the coil 620 without the support fixture 630.

Meanwhile, the width Wa of a sub soft magnetic layer may be different based on a material of the soft magnetic layer 610, an applicable frequency band, a required loss rate, etc.

Figure 7:
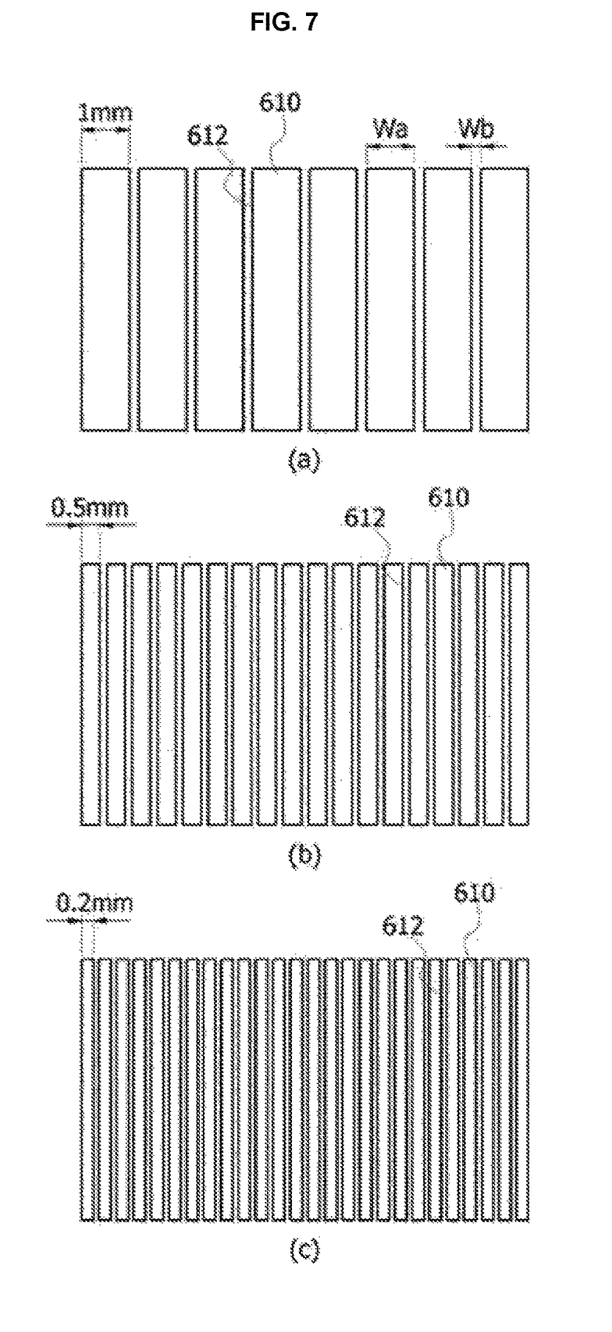
FIG. 7 is a top view illustrating a soft magnetic layer in which gaps are formed at intervals of 5 mm, 1 mm, and 0.5 mm in accordance with an embodiment of the present invention.
Figure 8:
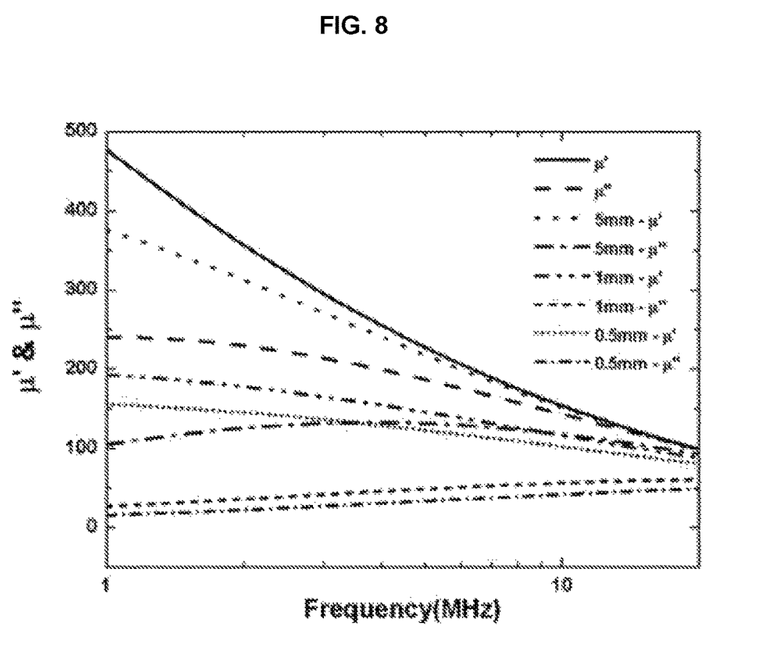
FIG. 8 is a graph illustrating a measurement result of a loss rate for an amorphous metallic ribbon based on an interval of gaps and a frequency.
Figure 9:
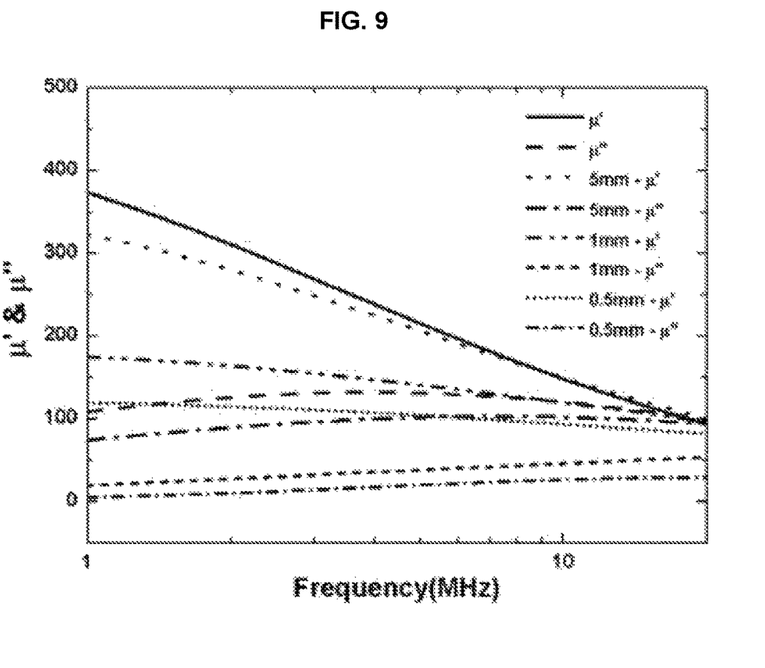
FIG. 9 is a graph illustrating a measurement result of a loss rate for a nanocrystalline metallic ribbon based on an interval of gaps and a frequency.

FIG. 7 is a top view illustrating a soft magnetic layer in which sub soft magnetic layers having widths of 1 mm, 0.5 mm, and 0.02 mm are formed in accordance with an embodiment of the present invention, FIG. 8 is a graph illustrating a measurement result of a loss rate for an amorphous metallic ribbon based on a width of each sub soft magnetic layer and a frequency, and FIG. 9 is a graph illustrating a measurement result of a loss rate for a nanocrystalline metallic ribbon based on the width of each sub soft magnetic layer and the frequency.

Referring to FIGS. 7A to 7C, each sub soft magnetic layer may be formed with a width Wa of 0.02 mm to 1 mm. Each sub soft magnetic layer may have a striped shape. Here, as the width Wa becomes narrower, the size of each loop formed in the soft magnetic layer 610 becomes smaller, and resistance at a boundary surface of the gaps 612 becomes larger and the eddy current becomes more reduced.

In FIGS. 8 and 9, the horizontal axis denotes frequency and the vertical axis denotes magnetic permeability $\mu'$ and loss rate $\mu''$. It can be noted that as the width of the sub soft magnetic layer becomes narrower, the eddy current loss becomes lower.

Referring to Table 1, it can be noted that at low frequency (for example, 1 MHz) and at high frequency (for example, 13.56 MHz), as the width of the sub soft magnetic layer of an amorphous metallic ribbon and a nanocrystalline metallic ribbon becomes narrower, the eddy current loss becomes lower.

Particularly, when the amorphous metallic ribbon is used for a material of the soft magnetic layer and the width of each sub soft magnetic layer is 1 mm or less, the loss rate ($\mu''/\mu' \times 100$) at low frequency is 13.89% or less and the loss rate at high frequency is 56.87% or less. On the contrary, when the nanocrystalline metallic ribbon is used for a material of the soft magnetic layer and the width of each sub soft magnetic layer is 1 mm or less, the loss rate ($\mu''/\mu' \times 100$) at low frequency is 11.12% or less and the loss rate at high frequency is 45.09% or less. Accordingly, it can be noted that the effect due to a formation of gaps is more noticeable in the nanocrystalline metallic ribbon with thin thickness.

Further, without gaps, the loss rate at high frequency is 96.92% in the amorphous metallic ribbon, and 91.12% in the nanocrystalline metallic ribbon. On the contrary, when gaps are formed at intervals of 1 mm or less, that is, when the width of each sub soft magnetic layer is 1 mm or less, the loss rate at high frequency is 56.87% or less in the amorphous metallic ribbon, and 45.09% or less in the nanocrystalline metallic ribbon. Therefore, when gaps are formed in the soft magnetic layer, it can be noted that the loss rate at high frequency is noticeably reduced.

Further, without gaps, the loss rate at low frequency is 50.58% in the amorphous metallic ribbon, and 28.91% in the nanocrystalline metallic ribbon. On the contrary, when gaps are formed at intervals of 1 mm or less, that is, when the width of each sub soft magnetic layer is 1 mm or less, the loss rate at low frequency is 13.89% or less in the amorphous metallic ribbon, and 11.12% or less in the nanocrystalline metallic ribbon. Therefore, when gaps are formed in the soft magnetic layer, it can be noted that the loss rate at low frequency is also reduced.

The sub soft magnetic layer according to embodiments of the present invention may be formed as a straight line having a width of 0.02 mm to 5 mm, preferably a width of 0.02 mm to 1 mm. It is not possible to implement the sub soft magnetic layer with a width smaller than 0.02 mm due to a constraint of a process, and when the width of the sub soft magnetic layer is over 1 mm, a high frequency loss rate may increase and the effect of reducing the eddy current loss may be decreased.

This written description sets forth the best modes of the invention. It will be understood by those skilled in the art that various modifications can be made without departing from the scope of the present invention and without changing essential features.

The invention claimed is:

1. A receiving antenna of a wireless power receiving device wirelessly charging electrical power, the receiving antenna comprising:
   a substrate;
   a soft magnetic layer stacked on the substrate, including a soft magnetic material, and having gaps at predetermined intervals; and
   a coil stacked on the soft magnetic layer, and configured to receive electromagnetic energy emitted from a wireless power transmission device,
   wherein the coil is wound in a direction parallel to the soft magnetic layer on the soft magnetic layer, and at least a part of the coil disposed between two gaps is disposed in parallel with the two gaps,
   wherein the soft magnetic layer includes a plurality of sub soft magnetic layers separated by the gaps,
   wherein each sub soft magnetic layer has a stripe shape,
   wherein the soft magnetic layer is a metallic ribbon, and
   wherein the gaps are filled with an acrylate-based resin.

2. The receiving antenna of claim 1, further comprising a support fixture which supports the soft magnetic layer and is disposed between the substrate and the soft magnetic layer.

3. The receiving antenna of claim 1, wherein a width of each of the sub soft magnetic layers is one to fifty times a thickness of the soft magnetic layer.

4. The receiving antenna of claim 1, wherein each of the sub soft magnetic layers is formed with a width of 0.02 mm to 5 mm.

5. The receiving antenna of claim 4, wherein each of the sub soft magnetic layers is formed with a width of 0.02 mm to 1 mm.

6. The receiving antenna of claim 3, wherein a width of the gap is 0.1 mm to 1 mm.

7. The receiving antenna of claim 1, wherein the metallic ribbon is a nanocrystalline metallic ribbon.

8. The receiving antenna of claim 1, wherein the plurality of sub soft magnetic layers are disposed on a same plane.

9. The receiving antenna of claim 1, wherein the gap is formed in a shape of a broken line.

10. A wireless power receiving device wirelessly charging electrical power, comprising:
    a substrate;
    a soft magnetic layer stacked on the substrate, including a soft magnetic material, and having gaps at predetermined intervals;
    a coil stacked on the soft magnetic layer, and configured to receive electromagnetic energy emitted from a wireless power transmission device;
    a circuit unit connected to the coil, and configured to convert the electromagnetic energy into electrical energy; and
    a storage unit configured to store the electrical energy,
    wherein the coil is wound in a direction parallel to the soft magnetic layer on the soft magnetic layer, and at least a part of the coil disposed between two gaps is disposed in parallel with the two gaps,
    wherein the soft magnetic layer includes a plurality of sub soft magnetic layers separated by the gaps,
    wherein each sub soft magnetic layer has a stripe shape,
    wherein the soft magnetic layer is a metallic ribbon, and
    wherein the gaps are filled with an acrylate-based resin.

11. The wireless power receiving device of claim 10, wherein the gap is formed in a shape of a broken line.

12. The wireless power receiving device of claim 10, wherein a width of the gap is 0.1 mm to 1 mm.

* * * * *